United States Patent

[11] 3,550,929

[72] Inventors Werner Meyer
Harenberg;
Gunter Braun, Ronnenberg, Germany
[21] Appl. No. 761,778
[22] Filed Sept. 23, 1968
[45] Patented Dec. 29, 1970
[73] Assignee Westinghouse Bremsen-Und Apparatebau, G.m.b.H.
Hannover, Germany
[32] Priority Oct. 28, 1967
[33] Germany
[31] No. W40910

[54] MECHANISM FOR CONTROLLING OUTPUT PRESSURE OF FLUID PRESSURE REGULATING VALVE
10 Claims, 1 Drawing Fig.

[52] U.S. Cl. .................................................. 267/175
[51] Int. Cl. .................................................. F16f 9/34
[50] Field of Search .......................................... 267/175, 61, 166, 170, 177, 176, 179

[56] References Cited
UNITED STATES PATENTS
2,629,538 2/1953 Replogle .................... 267/1(75)
3,279,778 10/1966 Jesperson .................... 267/1(75)

*Primary Examiner*—James B. Marbert
*Attorneys*—Adelbert A. Steinmiller and Ralph W. McIntire, Jr.

ABSTRACT: Mechanism for controlling output pressure of a fluid pressure regulating valve, in which the delivery pressure of the regulating valve is controlled in accordance with the axial position of a first member relative to a second member, the axial position being determined by a piston urging the first member in one axial direction opposed by an adjustable spring between the members, the tension of the spring being adjustable by a third member engaging the spring and disposed for axial adjustment relative to the second member, the spring constant being adjustable by axial adjustment of the third member relative to the coils of the spring to dispose a greater or lesser portion of the spring between the first and third members.

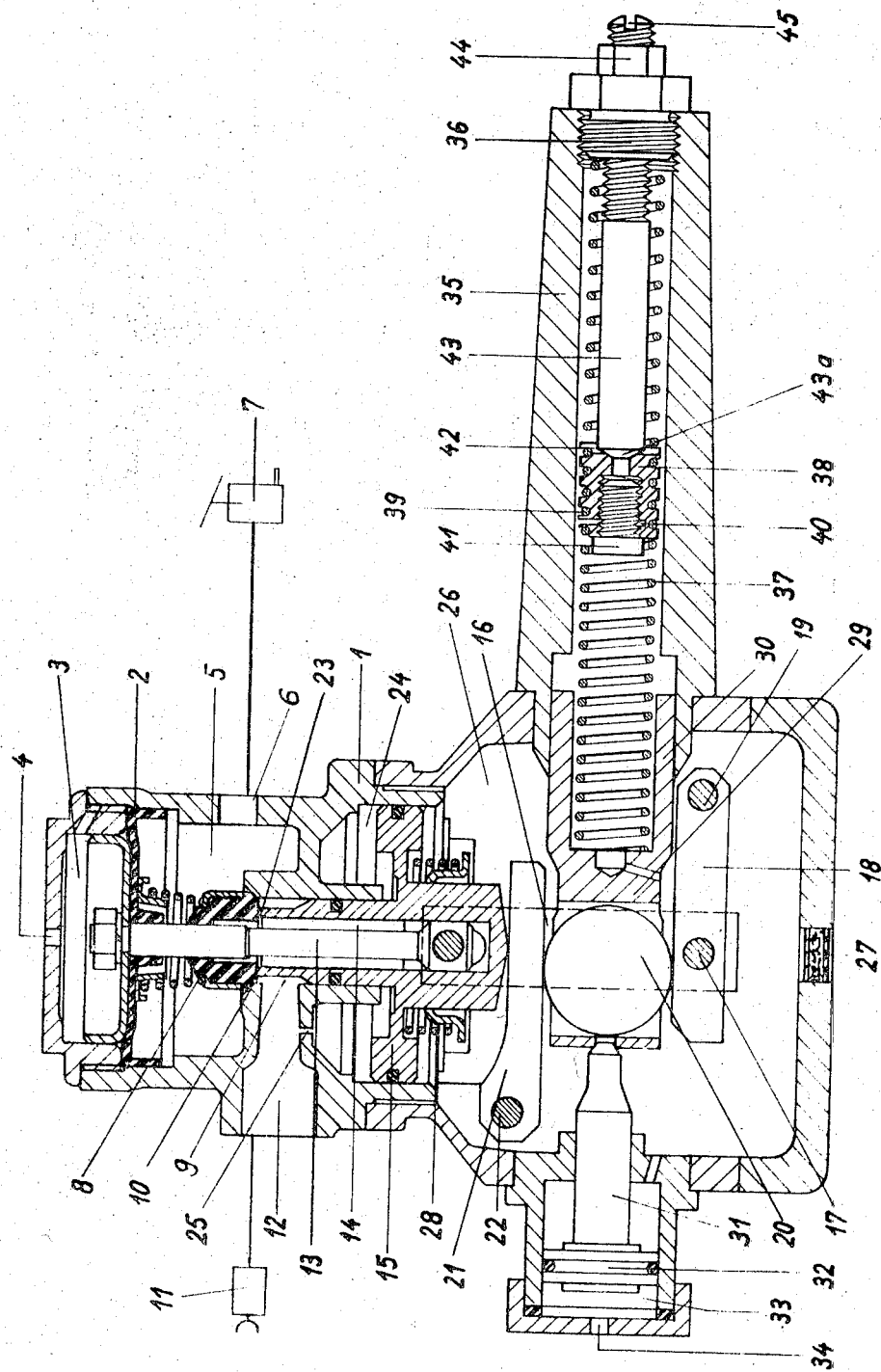

3,550,929

MECHANISM FOR CONTROLLING OUTPUT PRESSURE OF FLUID PRESSURE REGULATING VALVE

BACKGROUND OF THE INVENTION

Heretofore, in vehicle fluid pressure brake systems, it has been proposed to automatically alter the fluid pressure in the brake cylinder in accordance with the vehicle load, such as by air springs or bellows arrangements on the vehicle for establishing a load-varying pressure to control a brake force regulator valve device.

In one proposed system of this type, there is included a scale beam arrangement in which the position of a butting body along a path, relative to linkage between the butting body and the regulator valve, is controlled by a vehicle load-responsive piston opposed by a biasing spring, the position of the butting member along the path correspondingly controlling operation of the regulator valve to control brake application force in accordance with vehicle load. However, since each different type of vehicle requires a biasing spring having a different spring constant so as to coordinate the braking conditions with the load-unload conditions for each particular vehicle type, it has been necessary to manufacture biasing springs of different spring constants for each of the different types of vehicles.

SUMMARY OF INVENTION

It is the object of the present invention to provide, for use in a brake system of the type described, a spring adjusting mechanism for adjusting the spring constant and spring tension of a biasing spring in accordance with varying conditions of installation.

In the present invention, this object is achieved by disposing a coil spring coaxially between a pair of axially movable members, one end of the spring axially engaging one of the members, and the other end of the spring disposed within a throughbore in the other member. A cylindrical clamping member is disposed within the spring in releasably locked engagement with the coils or turns of the spring for axial adjustment relative to the spring to change the number of spring coils active between the clamping member and the one member to thereby change the spring constant. A support or stop member is removably secured in the other member on the side of the clamping member opposite the one member, and extends internally of the spring into axial engagement with the clamping member in opposition to the spring force on the active coils, the support member being axially adjustable in the other member to alter the tension of the active coils.

In one practical application of the invention, the clamping body is cylindrical in form and is disposed internally of the coil spring so that a helical groove on the exterior thereof engages with the helical form of the coil windings, the clamping member including a transverse slot extending substantially across the diameter of the clamping body so that the uncut portion forms a hinge between the two sections of the clamping body on each side of the slot. An axially extending screw in the clamping body forces the two clamping body sections together for clamping the body to the spring coils in the helical groove extending across the slot. The supporting projection for the clamping body comprises a rod threadedly received in the end of the throughbore, one end of the rod extending internally of the spring in axial abutment with the clamping body, the other end of the rod extending internally of the second member and including a slot to facilitate utilization of a tool to rotate the rod, thereby effecting axial adjustment of the rod for changing the tension of the active spring coils.

This and other objects will become more readily apparent in the following description taken in conjunction with the drawing, in which the single FIG. is sectional view of a fluid pressure regulating valve including the spring constant adjusting means of our invention.

Referring now to the drawings, there is shown a housing 1 including a control piston 2 above which is located a chamber 3 connected to atmosphere by means of the opening 4. Below the control piston 2 there is disposed the chamber 5 which is connected to the brake valve 7 by means of the port 6 and appropriate piping. The valve body 8, in the position shown, closes off the inlet valve seat 10 which connects the chamber 5 with the chamber 9.

The port 12 communicates the brake cylinder 11 with the chamber 9. The control piston 2 is connected to a piston rod 13 that is guided in a sealed manner through the valve body 8 into the cavity 14 of the piston 15. The fork 16 is secured to the lower end of the piston rod 13 and includes on the lower end thereof a lever 18 which is pivotally connected thereto by means of the stud 17, which stud is pivotally attached to the stud 19 secured to the housing 1. The lever 18, in conjunction with the butting body 20 having its upper side engaged with the lever 21 pivoted on the stud 22 secured to the housing 1, forms a transfer arrangement for the forces that are in existence on the control piston 2 and the piston 15. The piston 15 rests with its lower end on the upper side of the lever 21, whereas the upper end thereof carries the outlet valve seat 23 which, in the position shown, rests on the valve body 8. The chamber 24 on the upper side of the piston 15 is communicated with the chamber 9 by the means of the passage 25. The chamber 26 below the piston 15 is always in communication with the atmosphere by means of the exhaust port 27. By means of the pressure spring 28, the piston 15 is connected with the piston rod 13 of the control piston 2. The butting body 20 is guided in the holder 29 by the guiding projection 30. The piston rod 31 of the adjusting piston 32 axially abuts the holder 29, and includes a chamber 33 accessible to a fluid pressure medium by means of port 34, the pressure medium providing a load-dependent pressure, as for an example, an air pressure subjected to air spring bellows pressure.

The guiding projection 30 of the holder 29 for the butting body 20 is disposed for axial movement in the housing projection 35. Inside of the housing projection 35 and between the holder 29 and the connection screw 36 of the housing projection 35 there is compressed the adjusting spring 37. In the coil windings of the adjusting spring 37 there is secured the cylindrically-shaped clamping body 38. The spiral-shaped or helical groove 39 on the exterior of the clamping body engages with the coil windings. The spiral-shaped groove 39 is cut by means of a transverse slot 40. By compressing together two sections of the clamping member formed by the slot 40, through the means of the clamping screw 41, the clamping body 38 is releasably secured to the coil windings. The slot 42 on the right end of rod 43 facilitates the use of a tool, as for example, a screw driver, for adjusting the clamping body 38 after the release of the clamping screw 41. On the clamping body 38 there is abutted a projection 43a of the threaded rod 43 which, by the means of a threaded relationship through cap screw 36 of the housing projection 35, extends externally of the projection 35, the adjustment of which rod is secured by means of the lock nut 44. The threaded rod 43 with the projection 43a is rotatable relative to the clamping body 38. The slot 45 facilitates the use of a tool to rotate rod 43.

The operation of the fluid pressure regulating valve is well known, but will now be briefly described for purposes of illustrating environmental operation of the spring adjusting mechanism of the present invention.

It will be assumed that the vehicle, not shown, is partially loaded so that a corresponding pressure in piping 34 applies a pressure in chamber 33 urging piston 32 and stem 31 rightwardly in opposition to biasing spring 37 to move projection 30 and butting member 20. Under this condition, when brake valve 7 is operated to pressurize chamber 5, piston 2 moves upwardly, carrying with it piston rod 13, spring 28, piston 15, lever 21, butting member 20, yoke 16 and lever 18. The upward movement of piston 15 unseats valve body 8 so that pressurized fluid in chamber 5 is communicated via valve seat 10 with brake cylinder 11 and, via passage 25, with chamber 24. As pressure in chamber 24 increases, piston 15 moves downwardly carrying with it lever 21, butting member 20, lever 8, yoke 16 and rod 13 until valve body 8 is seated upon valve seat 10, at which time the regulator valve is in the lap position. The downward force on the face of piston 15 is multiplied by the transverse displacement of the point of engagement of the butting member 20 with lever 21 relative to the point of engagement of the lowermost portion of the piston 15 with the upper portion of the lever arm 21. Accordingly, the positioning of the butting member by the piston 32 to increase or decrease the aforementioned displacement will proportionately decrease or increase, respectively, the pressure required to lap the regulating valve.

For example, as the vehicle load increases, the pneumatic spring pressure increases moving piston 32 and the butting body 20 to the right against the opposing force of the adjusting spring 37. If the vehicle is unloaded, the butting body assumes a corresponding leftward position so that the regulating valve assumed lap position at a relatively larger pressure differential between chambers 5 and 24. If, in contrast thereto, the vehicle is loaded more heavily, the butting body 20 is correspondingly moved to a rightward position decreasing the aforementioned displacement and thereby decreasing the multiplication of the force on piston 15 in chamber 24 so that a relatively smaller pressure difference is present between chambers 5 and 24, that is, for a given pressure in chamber 5, a proportionately larger pressure is attained in chamber 24, and therefore in brake cylinder 11, to thereby provide a greater braking force for a more heavily loaded vehicle.

When pressure in chamber 5 is reduced to release the brakes, the larger pressure in chamber 24 unseats valve body 8 until pressure in chamber 24 and brake cylinder 11 lowers sufficiently to permit the valve body 8 to be reseated by its biasing spring.

In now describing the operation of the spring adjusting mechanism, it will be observed that by loosening nut 44 to unlock the setting of the threaded rod 43, the rod 43 may be rotated in one direction or the other about its axis to thread the rod inwardly or outwardly of cap screw 36, thereby moving the clamping member 38 leftwardly or rightwardly, respectively to increase or decrease the tension of the active spring coils disposed between projection 30 and the clamping member 38, the adjustment of the spring tension thus being effected in a stepless manner.

If now it is desired to change the spring constant, cap screw 36, rod 43, spring 37 and clamping body 38 are removed from the throughbore in the projection 35, whereupon clamping screw 41 is loosened to release the spring coils, and the clamping body is rotated relative to the spring to axially adjust the clamping member along the coils of the spring. For example, if the clamping body 38 is moved to the right relative to the spring the number of active turns or coils between the projection 30 and the clamping body is increased thereby decreasing the spring constant. Conversely, leftward movement of the clamping body relative to the spring decreases the number of active turns or coils, thus increasing the spring constant. By the foregoing stepless change in the spring constant of the biasing spring, it is possible to exactly match the operation of the brake force regulator to different pneumatic spring pressure sequences varying in accordance with different vehicle types, thereby assuring optimum brake forces for each condition of loading.

We claim:
1. Apparatus for altering the spring constant of a spring compressible between a pair of relatively movable members, comprising:
   a. a pair of members disposed for relative movement toward and away from each other along a path;
   b. a compression spring disposed for biasing said members away from each other;
   c. one end of said spring engaging one of said pair of members;
   d. first means releasably attached to said spring intermediate the ends thereof and when released is adjustable along the length of said spring to dispose a greater or lesser longitudinal portion of said spring between said one member and said first means; and
   e. stop means attached to the other of said pair of members and engaging said first means to stop said first means relative to said other of said pair of members when said portion of said spring is under compression.

2. An apparatus as recited in claim 1, in which said stop means is adjustable relative to said other member along said path to alter the tension of said spring portion.

3. An apparatus as recited in claim 1, in which:
   a. said spring comprises a helical spring having a plurality of turns; and
   b. said first means comprises a clamp releasably engageable with the turns of said helical spring.

4. An apparatus, as recited in claim 3, in which:
   a. said clamp comprises a cylindrical body and including on the surface thereof an axially extending helical groove in which at least a portion of one turn of said helical spring is seated;
   b. said cylindrical body comprising a pair of normally spaced relatively coaxially movable portions each including a portion of said helical groove; and
   c. means for forcibly moving said pair of body portions toward one another to displace the helical groove portion in one body portion of said pair of body portions relative the helical groove portion in the other member of said pair of body members to clamp the body members to the helical spring.

5. An apparatus, as recited in claim 4, in which said means forcibly moving said pair of body portions toward one another comprises screw means.

6. An apparatus, as recited in claim 4, in which said body portions comprising each of two portions is formed by a transverse slot extending from one side of said body substantially to the other side of said body.

7. An apparatus, as recited in claim 2, in which said stop member is adjustable relative to said other member via screw threads on said other member and on said stop member.

8. An apparatus, as recited in claim 1, in which:
   a. said spring comprises a helical spring;
   b. said first member is disposed internally of said helical spring; and
   c. said stop member comprising a rod disposed within said helical spring and threadedly attached to said second member for axial adjustment relative to said second member.

9. An apparatus, as recited in claim 8, in which:
   a. said spring is coaxially disposed in a throughbore in said other member;
   b. a cap screw is threadedly disposed in the end of said throughbore;
   c. said cap screw having a threaded axially extending throughbore therein; and
   d. said stop member comprising a rod threadedly extending through said throughbore and having one end thereof extending internally of said throughbore in engagement with said first member, and having the other end thereof extending externally of said throughbore.

10. An apparatus, as recited in claim 9, in which:
   a. said other end of said rod has threads thereon; and
   b. a lock nut threaded on said threads on said other end of said rod, which, when tightened against said cap screw, locks said rod in any axially adjusted setting.